US010157486B2

United States Patent
Suzuki et al.

(10) Patent No.: US 10,157,486 B2
(45) Date of Patent: Dec. 18, 2018

(54) DEFORMATION FIELD CALCULATION APPARATUS, METHOD, AND COMPUTER READABLE STORAGE MEDIUM

(71) Applicant: CANON KABUSHIKI KAISHA, Tokyo (JP)

(72) Inventors: Eiji Suzuki, Kyoto-shi (JP); Itaru Otomaru, Tokyo (JP); Kiyohide Satoh, Kawasaki-shi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 40 days.

(21) Appl. No.: 14/926,467

(22) Filed: Oct. 29, 2015

(65) Prior Publication Data
US 2016/0125584 A1    May 5, 2016

(30) Foreign Application Priority Data

Nov. 5, 2014   (JP) .................................. 2014-225433

(51) Int. Cl.
*G06T 11/60* (2006.01)
*G06T 7/00* (2017.01)

(52) U.S. Cl.
CPC ............. *G06T 11/60* (2013.01); *G06T 7/0014* (2013.01); *G06T 2207/10072* (2013.01); *G06T 2207/30096* (2013.01); *G06T 2210/41* (2013.01)

(58) Field of Classification Search
None
See application file for complete search history.

(56) References Cited

U.S. PATENT DOCUMENTS

| | | | | | |
|---|---|---|---|---|---|
| 5,991,459 | A | * | 11/1999 | Fogel | G06T 7/269 382/264 |
| 6,658,059 | B1 | * | 12/2003 | Iu | H04N 19/51 348/699 |
| 7,610,162 | B2 | * | 10/2009 | Grupp | G01B 5/008 33/503 |
| 9,269,140 | B2 | * | 2/2016 | Machado | A61B 5/0042 |
| 9,478,048 | B2 | * | 10/2016 | Royalty | G06T 11/003 |
| 9,495,725 | B2 | * | 11/2016 | Kim | G06T 3/0068 |
| 9,684,980 | B2 | * | 6/2017 | Royalty | G06T 11/003 |
| 9,782,141 | B2 | * | 10/2017 | Yu | A61B 6/527 |

(Continued)

FOREIGN PATENT DOCUMENTS

JP        H08336517 A     12/1996
WO   WO 2012100819 A1 *  8/2012  ........... G06K 9/6211

OTHER PUBLICATIONS

Objective weather-map analysis, Journal of Meteorology, 6(6), pp. 386-392, 1949.*

(Continued)

*Primary Examiner* — Michelle M Entezari
(74) *Attorney, Agent, or Firm* — Carter, DeLuca, Farrell & Schmidt, LLP

(57) ABSTRACT

An image processing apparatus includes: a calculation unit configured to calculate deformation information of an object deformed from a first deformation state to a second deformation state; a degree-of-deviation calculation unit configured to calculate a degree of deviation of the deformation information with respect to a deformation model representing a deformation state of the object; and a display control unit configured to display the calculated degree of deviation.

11 Claims, 7 Drawing Sheets

(56) References Cited

U.S. PATENT DOCUMENTS

| | | | | |
|---|---|---|---|---|
| 2004/0220724 | A1* | 11/2004 | Hahn | B60Q 9/005 701/301 |
| 2005/0057660 | A1* | 3/2005 | Nonaka | H04N 5/23248 348/208.99 |
| 2005/0249434 | A1* | 11/2005 | Xu | G06K 9/6211 382/294 |
| 2007/0189599 | A1* | 8/2007 | Ryu | G06K 9/46 382/154 |
| 2008/0137934 | A1* | 6/2008 | Sakaguchi | A61B 6/4441 382/132 |
| 2009/0060306 | A1* | 3/2009 | Ohuchi | A61B 8/0858 382/131 |
| 2009/0129650 | A1* | 5/2009 | Hawkes | G06T 7/35 382/131 |
| 2010/0156936 | A1* | 6/2010 | Maeda | G06F 17/30259 345/647 |
| 2010/0272311 | A1* | 10/2010 | Nir | G06T 7/269 382/100 |
| 2012/0232384 | A1* | 9/2012 | Wu | G06K 9/64 600/434 |
| 2012/0288173 | A1* | 11/2012 | Rai | G06K 9/46 382/131 |
| 2012/0300998 | A1* | 11/2012 | Ioudovski | A61B 3/0025 382/128 |
| 2013/0249908 | A1* | 9/2013 | Black | G06T 17/00 345/420 |
| 2014/0153784 | A1* | 6/2014 | Gandolph | G06T 7/0075 382/107 |
| 2014/0343388 | A1* | 11/2014 | Thakur | G06K 9/00496 600/374 |
| 2015/0063691 | A1* | 3/2015 | Jolly | G06K 9/4652 382/165 |
| 2015/0185298 | A1* | 7/2015 | Crozier | A61B 5/055 702/19 |
| 2015/0310673 | A1* | 10/2015 | Romdhani | G06K 9/00275 345/420 |
| 2016/0005169 | A1* | 1/2016 | Sela | A61B 5/0066 382/131 |
| 2016/0151050 | A1* | 6/2016 | Georgii | A61B 5/721 600/437 |

OTHER PUBLICATIONS

DeCarlo, Douglas, and Dimitris Metaxas. "The integration of optical flow and deformable models with applications to human face shape and motion estimation." Computer Vision and Pattern Recognition, 1996. Proceedings CVPR'96, 1996 IEEE Computer Society Conference on. IEEE, 1996.*

Von Funck, Wolfram, Holger Theisel, and Hans-Peter Seidel. "Vector field based shape deformations." ACM Transactions on Graphics (TOG). vol. 25. No. 3. ACM, 2006.*

* cited by examiner

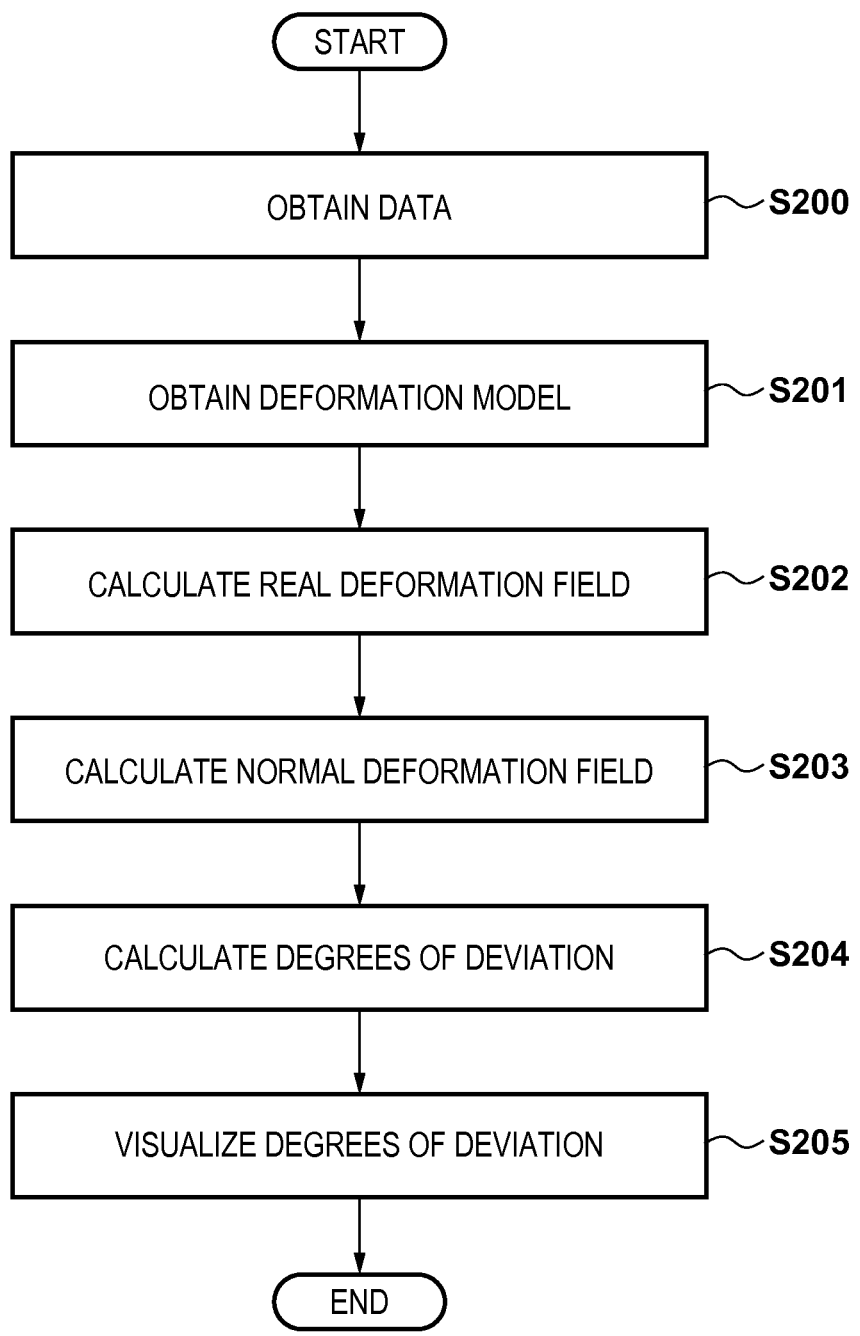

301

302

303

304

301   401

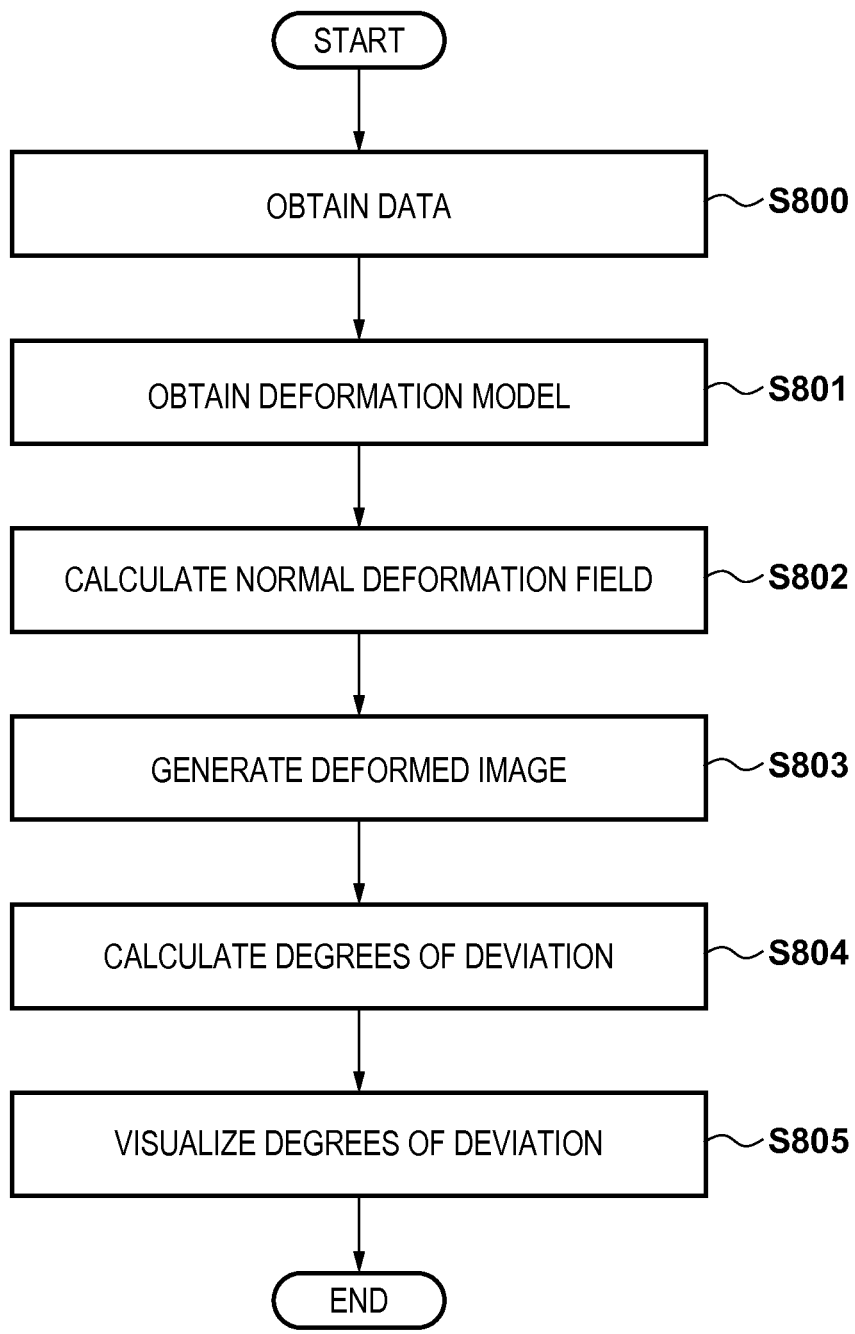

DEFORMATION FIELD CALCULATION APPARATUS, METHOD, AND COMPUTER READABLE STORAGE MEDIUM

BACKGROUND OF THE INVENTION

Field of the Invention

The present invention relates to an image processing technique of processing images captured by various image capturing apparatuses (modalities).

Description of the Related Art

In the medical field, image diagnosis is performed using medical images. A doctor finds a lesion portion (a portion which is suspected as a lesion) based on imaging findings obtained from images, and determines the type, grade of malignancy, degree of progression, and the like of an abnormality. Japanese Patent Laid-Open No. 8-336517 (to be referred to as patent literature 1 hereinafter) discloses a technique of observing a temporal change of a lesion portion by aligning images of an object captured at different dates/times with each other to display the difference between the images.

However, image diagnosis requires more information representing the features of a lesion portion in addition to information about hardness obtained by elastography and/or a temporal change obtained by the technique described in patent literature 1. The present invention has been made in consideration of the above problem, and provides new information representing the features of a lesion portion which is deformed differently with respect to the behavior of the lesion portion when an object is deformed.

SUMMARY OF THE INVENTION

According to one aspect of the present invention, there is provided an image processing apparatus comprising: a calculation unit configured to calculate deformation information of an object deformed from a first deformation state to a second deformation state; a degree-of-deviation calculation unit configured to calculate a degree of deviation of the deformation information with respect to a deformation model representing a deformation state of the object; and a display control unit configured to display the calculated degree of deviation.

According to another aspect of the present invention, there is provided an image processing apparatus comprising: an obtaining unit configured to obtain an image by capturing an object in a first deformation state and an image by capturing the object in a second deformation state; an image generation unit configured to generate, based on a model representing deformation of a normal tissue of the object, a deformed image by deforming the image in the first deformation state into the second deformation state; a degree-of-deviation calculation unit configured to calculate a degree of deviation of the image in the second deformation state with respect to the deformed image; and a display control unit configured to display the calculated degree of deviation.

According to still another aspect of the present invention, there is provided an image processing apparatus comprising: an obtaining unit configured to obtain an image by capturing an object in a first deformation state and an image by capturing the object in a second deformation state; a position obtaining unit configured to obtain position information of a reference point indicating the same portion on the object from each of the image captured in the first deformation state and the image captured in the second deformation state; a setting unit configured to set a corresponding point of interest on the object for each of the image captured in the first deformation state and the image captured in the second deformation state; a degree-of-deviation calculation unit configured to calculate, as a degree of deviation, a change between a positional relationship between the reference point and the point of interest in the image captured in the first deformation state and a positional relationship between the reference point and the point of interest in the image captured in the second deformation state; and a display control unit configured to display the calculated degree of deviation.

Further features of the present invention will become apparent from the following description of exemplary embodiments (with reference to the attached drawings).

BRIEF DESCRIPTION OF THE DRAWINGS

FIG. 2 is a flowchart illustrating an overall processing procedure according to the first embodiment;

FIG. 8 is a flowchart illustrating an overall processing procedure according to the third embodiment.

DESCRIPTION OF THE EMBODIMENTS

Embodiments of the present invention will be exemplarily described in detail below with reference to the accompanying drawings. Note that components to be described in these embodiments are merely examples. The technical scope of the present invention is defined by the scope of the claims, and is not limited by the following embodiments.

First Embodiment: Deviation from Normal Deformation

An image processing apparatus according to this embodiment receives a plurality of three-dimensional tomographic images obtained by capturing the same object in different deformation states, and visualizes and displays degrees of deviation from the deformation model of a normal tissue with respect to the deformation of the object between the images. The image processing apparatus according to this embodiment will be described below.

<Arrangement of Image Processing System 1000>

Figure 1:
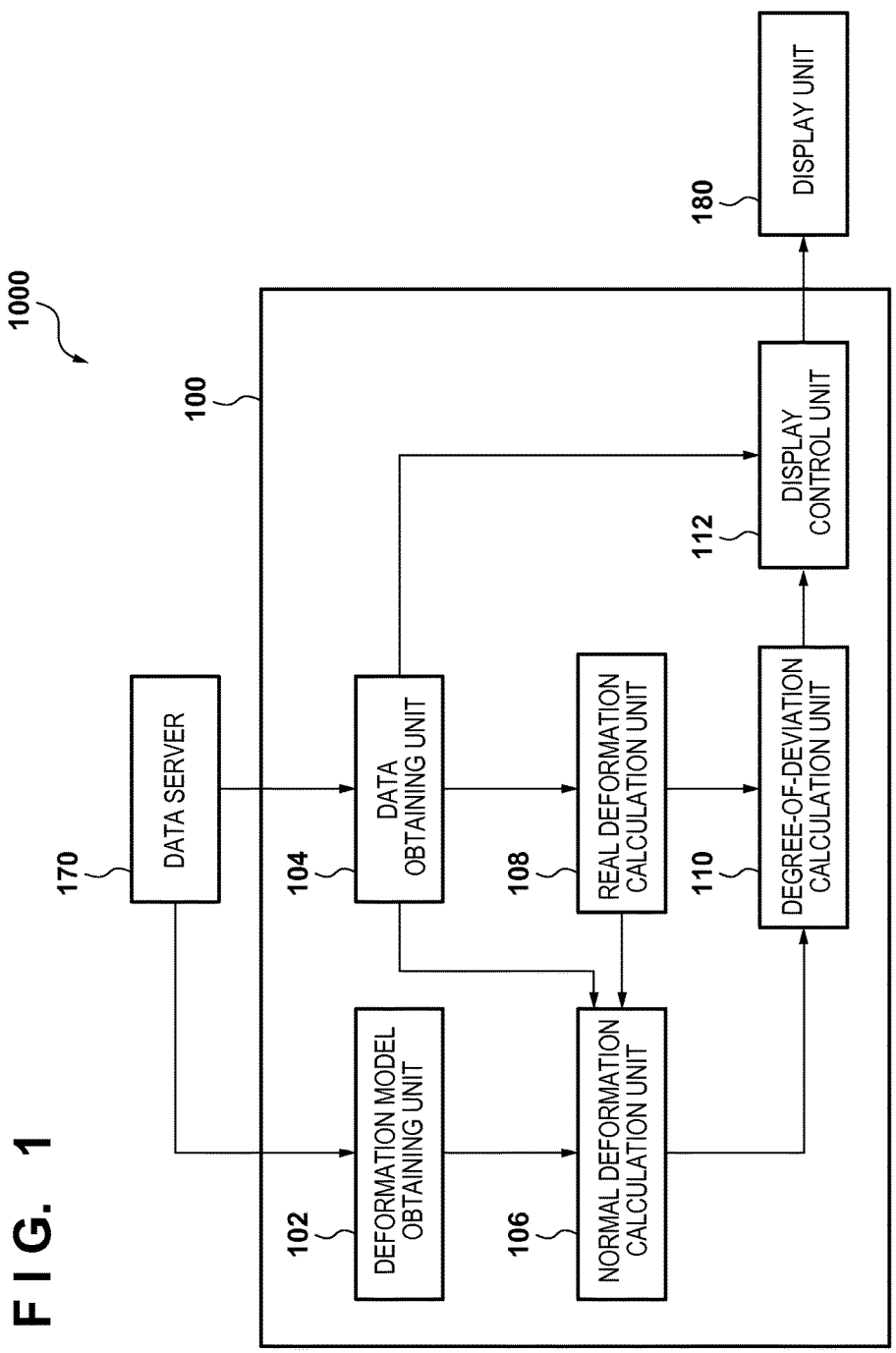
FIG. 1 is a block diagram showing the functional arrangements of an image processing system and image processing apparatus according to the first embodiment.

FIG. 1 is a block diagram exemplifying the arrangement of the image processing system 1000 according to this embodiment. The image processing system 1000 includes an image processing apparatus 100, a data server 170, and a display unit 180. Note that the components of the image processing system 1000 are not limited to these apparatuses, and the image processing system may be configured to further include other components or not include some of the components.

The data server 170 holds a plurality of three-dimensional tomographic images (volume images) obtained by capturing in advance the same object (target case) in different deformation states (different body postures, different conditions of respiration, or the like). An image capturing apparatus (modality) for capturing a three-dimensional tomographic image is, for example, an MRI apparatus, X-ray CT apparatus, three-dimensional ultrasonic imaging apparatus, photoacoustic tomography apparatus, a PET (Positron Emission Tomography)/SPECT (Single Photon Emission Computed Tomography), or OCT apparatus. In this embodiment, the images are desirably captured by the same modality in the same imaging mode at almost the same time. Note that a combination of images is not limited to this. As long as sufficient deformation occurs between images, the images may be obtained by capturing the object by different modalities or in different imaging modes. The images may be obtained by capturing the same patient at different dates/times. A case in which the data server 170 targets breast MRI images and holds the first image obtained by capturing an object in a supine position and the second image obtained by capturing the object in a prone position will be exemplified below.

Figure 3A:
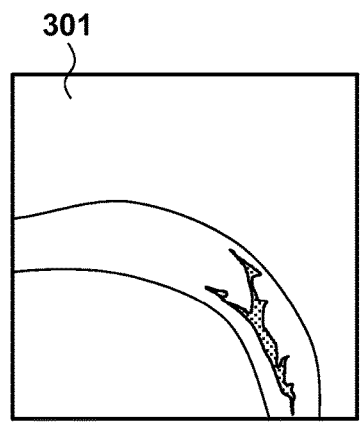
FIGS. 3A to 3D are views respectively exemplifying input images, a real deformation field, and a normal deformation field according to the first embodiment.
Figure 3B:
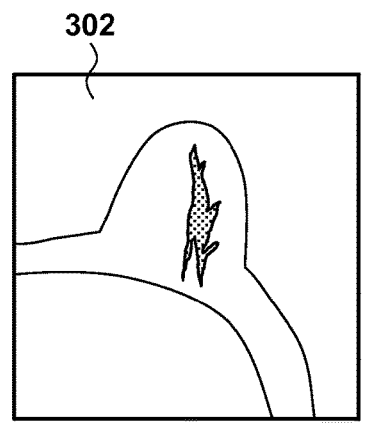

FIG. 3A is a view showing an example of the first image and FIG. 3B is a view showing an example of the second image. Note that the deformation state of the object when capturing the first image will be referred to as the first deformation state hereinafter, and the deformation state of the object when capturing the second image will be referred to as the second deformation state hereinafter. A data obtaining unit 104 obtains the images of the object held in the data server 170, and inputs them to the image processing apparatus 100.

The data server 170 further holds the deformation model of a normal tissue when the object is deformed from the first deformation state into the second deformation state. The deformation model is constructed in advance based on the first images (supine position MRI images) obtained by capturing a plurality of normal objects (normal cases) in the supine position (first deformation state) and the second images (prone position MRI images) obtained by capturing the normal objects in the prone position (second deformation state). The deformation model is formed from two elements: a standard object image and a standard deformation field (standard deformation information) defined on the space of the standard object image.

The standard object image is generated by obtaining the average shape of the plurality of first images, projecting (overlaying) the voxel values (for example, intensities) of the first images onto the average shape, and then obtaining the average of the voxel values (intensities). The average shape is obtained by performing deformable registration for the first images of all the normal cases, and obtaining the average shape of the first images. After that, the voxel values (intensities) of the first images are projected onto the average shape, and the average of the voxel values (intensities) is obtained, thereby generating the standard object image. That is, the standard object image is an average image obtained by averaging the shapes and voxel values (intensities) of the first images, and projecting (overlaying) the average voxel value (intensity) onto the average shape. The standard object image can be an image of an average object (a supine position MRI image of an average breast) in the first deformation state.

On the other hand, the standard deformation field (standard deformation information) is obtained by projecting, onto the average shape, a deformation field (deformation information) from the first image to the second image, which has been estimated by performing deformable registration for the first and second images of the normal cases, and performing statistical processing by principal component analysis after projection. At this time, principal component analysis may be performed for the displacement amount of each point obtained by sampling the deformation field at a predetermined interval, or performed for the control amount of each control point after parametrically expressing the deformation field by FFD (Free-Form Deformation) or the like.

In either processing, the standard deformation field formed by an average deformation field and a principal component deformation field is generated. In the following description, $T_{ave}(p)$ represents the average deformation field, and $T_{eigen\_i}(p)$ (i indicates the number of the principal component) represents the principal component deformation field. Each of the deformation fields can be regarded as a function having a three-dimensional vector representing deformation from the first deformation state to the second deformation state with respect to each position p on the coordinate system of the standard object image. The thus constructed deformation model is a model (statistic deformation model) representing statistically appropriate deformation (normal deformation) from the first deformation state to the second deformation state. That is, the deformation model is a model representing deformation from the first deformation state to the second deformation state and indicating how the normal object (normal case) is deformed. Note that the standard object image and the standard deformation field may be the first image of a typical normal case and a deformation field from the first image to the second image in the typical normal case. The deformation model held in the data server 170 is input to the image processing apparatus 100 via a deformation model obtaining unit 102.

The display unit 180 displays display images generated by the image processing apparatus 100 and various kinds of information such as degrees of deviation. In addition, a GUI for obtaining an instruction from the user is arranged on the display unit 180.

<Functional Block Arrangement of Image Processing Apparatus 100>

The image processing apparatus 100 includes the deformation model obtaining unit 102, the data obtaining unit 104, a normal deformation calculation unit 106, a real deformation calculation unit 108, a degree-of-deviation calculation unit 110, and a display control unit 112. A CPU (not shown) controls the overall processing of the image processing apparatus 100, and controls the operation of each functional block by reading out a program and executing it.

The deformation model obtaining unit 102 obtains the deformation model input from the data server 170 to the image processing apparatus 100. The data obtaining unit 104 obtains the first and second images input from the data server 170 to the image processing apparatus 100. The normal deformation calculation unit 106 calculates, in the form of a deformation field (to be referred to as a normal deformation field hereinafter) from the first image to the second image, deformation on the assumption that the deformation of a target case complies with the deformation model of a normal tissue, and obtains it. The real deformation calculation unit 108 calculates deformation actually occurring between the first and second images of the target case in the form of a deformation field (to be referred to as a real deformation field hereinafter) from the first image to the second image, and obtains it. The degree-of-deviation calculation unit 110 obtains the normal deformation field from the normal deformation calculation unit 106, and obtains the real deformation field from the real deformation calculation unit 108. The degree-of-deviation calculation unit 110 calculates degrees of deviation based on information about the obtained normal deformation field and real deformation field. The display control unit 112 performs display control to display cross-sectional images of the first and second images and information about the degrees of deviation on the display unit 180.

<Processing Executed by Image Processing Apparatus 100>

A processing procedure executed by the image processing apparatus 100 according to this embodiment will be described with reference to a flowchart shown in FIG. 2.

(Obtaining of Data: S200)

In step S200, the data obtaining unit 104 obtains the first and second images of the target case from the data server 170. The data obtaining unit 104 outputs the obtained images to the normal deformation calculation unit 106, real deformation calculation unit 108, and display control unit 112.

(Obtaining of Deformation Model: S201)

In step S201, the deformation model obtaining unit 102 obtains the deformation model from the data server 170. The deformation model obtaining unit 102 outputs the obtained deformation model to the normal deformation calculation unit 106.

(Calculation of Real Deformation Field: S202)

Figure 3C:
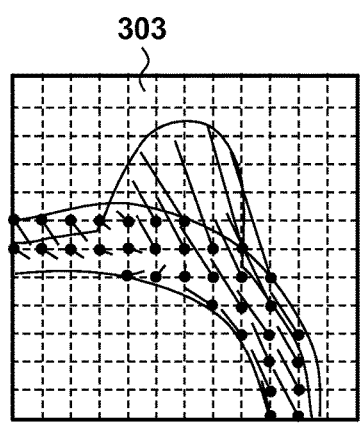

In step S202, the real deformation calculation unit 108 performs deformable registration of the first and second images of the target case, and calculates the real deformation field (the deformation field of deformation which has actually occurred) from the first image to the second image. To calculate the real deformation field, the real deformation calculation unit 108 can use a known registration method such as an FFD (Free-Form Deformation) method, or an LDDMM (Large Deformation Diffeomorphic Metric Mapping) method based on the image similarity or corresponding feature points between the first image and the second image. The real deformation calculation unit 108 outputs the calculated real deformation field to the normal deformation calculation unit 106 and degree-of-deviation calculation unit 110. In the following description, $T_{real}(p)$ represents the real deformation field obtained in this step where p represents an arbitrary coordinate point on the first image, and $T_{real}(p)$ represents actual displacement (real deformation field) at the coordinate point p. FIG. 3C is a view showing an example of a real deformation field 303 obtained by the real deformation calculation unit 108. FIG. 3C shows the distribution of deformation states actually occurring between the first and second images of the target case.

(Calculation of Normal Deformation Field: S203)

In step S203, the normal deformation calculation unit 106 calculates the normal deformation field from the first image to the second image of the target case based on the deformation model obtained in step S201. Note that the first and second images are images which have been obtained by the normal deformation calculation unit 106 from the data obtaining unit 104 in step S200. The normal deformation calculation unit 106 outputs the calculated normal deformation field to the degree-of-deviation calculation unit 110.

The normal deformation calculation unit 106 obtains the parameters of the deformation model best expressing the real deformation field $T_{real}(p)$ obtained by the real deformation calculation unit 108 in step S202. The normal deformation calculation unit 106 obtains, as the normal deformation field, a deformation field expressed by the obtained parameters. More specifically, to obtain the normal deformation field, the normal deformation calculation unit 106 performs deformable registration of the standard object image of the deformation model and the first image of the target case, and obtains a deformation field $T_{norm}(p)$ from the first image to the standard object image. Note that to perform deformable registration between the images, the normal deformation calculation unit 106 can use a known method, similarly to the processing in step S202.

The normal deformation calculation unit 106 calculates coefficients of linear combination $\alpha_i$ of $T_{eigen\_i}(p)$, which approximates the real deformation field $T_{real}(p)$ most, by using the deformation field $T_{norm}(p)$ from the first image to the standard object image and the standard deformation field (that is, the average deformation field $T_{ave}(p)$ and principal component deformation field $T_{eigen\_i}(p)$) of the deformation model. To do this, by using the coefficients of linear combination $\alpha_1, \ldots, \alpha_N$ of the deformation model as unknown parameters, the "normal deformation" of the first image of the target case is given by:

$$T_{model}(p|\alpha_1, \ldots, \alpha_N) = T_{ave}(T_{norm}(p)+p) + \Sigma_{1 \leq i \leq N}(\alpha_i T_{eigen\_i}(T_{norm}(p)+p)) \quad (1)$$

where N represents the number of principal component deformation fields (principal component deformation fields $T_{eigen\_i}(p)$) used as the deformation model. A predetermined fixed value may be used as the value of N or the value of N may be changed, as needed, by the user of the image processing apparatus 100 via a GUI (not shown). The normal deformation calculation unit 106 obtains the parameter $\alpha_i$ which minimizes the residual (err) between the deformation field $T_{model}(p)$ and the real deformation field $T_{real}(p)$ at each point (each point sampled at the predetermined interval) p within an object region $\Omega_1$ of the first image by defining the residual by:

$$\text{err} = \Sigma_{p \in \Omega_1} |T_{real}(p) - T_{model}(p|\alpha_1, \ldots, \alpha_N)| \quad (2)$$

Figure 3D:
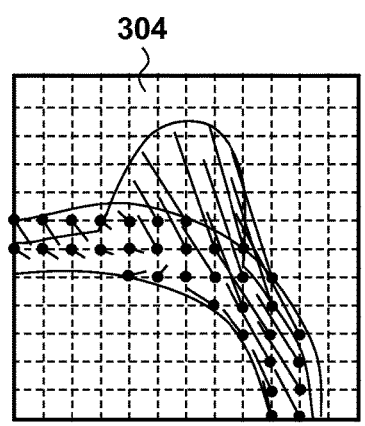

That is, the normal deformation calculation unit 106 estimates the "normal deformation" of the first image of the target case, which approximates the real deformation field $T_{real}(p)$ most, based on the obtained parameter $\alpha_i$. The deformation field $T_{model}(p)$ at this time is obtained as a normal deformation field $T_{ideal}(p)$. Note that the normal deformation calculation unit 106 can use a known linear solution to calculate the parameter $\alpha_i$, and analytically derive the value of the parameter $\alpha_i$ as the solution of a linear equation. Note that a method of driving the parameter $\alpha_i$ by the normal deformation calculation unit 106 is not limited to the method of minimizing the sum (err) of errors defined by equation (2). The normal deformation calculation unit 106 can obtain the parameter $\alpha_i$ by, for example, excluding the points p at each of which the error is large by using a known outlier removal algorithm such as RANSAC (RANdom SAmple Consensus) or M-estimation, and minimizing the sum of the errors at the remaining points. FIG. 3D is a view showing an example of a normal deformation field 304 obtained by the normal deformation calculation unit 106.

(Calculation of Degrees of Deviation: S204)

In step S204, for each voxel within the object region $\Omega_1$ on the first image, the degree-of-deviation calculation unit 110 calculates the degree of deviation of displacement at a position corresponding to the voxel. The degree-of-deviation calculation unit 110 generates a volume image (to be referred to as a degree-of-deviation image hereinafter) having the degree of deviation in each voxel as a voxel value. The degree-of-deviation calculation unit 110 outputs the generated degree-of-deviation image to the display control unit 112.

Note that the degree-of-deviation calculation unit 110 can calculate a degree of deviation K(pj) in each voxel (a three-dimensional position is represented by pj) by:

$$K(pj)=|T_{real}(pj)-T_{ideal}(pj)| \qquad (3)$$

Equation (3) indicates calculation of the norm of the difference between real displacement (real deformation field) at the point pj of interest and displacement (normal deformation field) at the same point (point pj) based on the statistically normal deformation model. Therefore, if the difference between the real displacement (real deformation field) at the point pj and the displacement (normal deformation field) based on the statistically normal deformation model is small, the value of the degree of deviation K(pj) is small. Alternatively, if the difference is large, the value of the degree of deviation K(pj) is large.

Note that if the degree of deviation K(pj) is calculated as a degree of deviation between the real deformation field $T_{real}(pj)$ and the normal deformation field $T_{ideal}(pj)$, another method may be used for calculation. For example, the degree-of-deviation calculation unit 110 can calculate the degree of deviation based on the angle difference between a vector representing the real deformation field and a vector representing the normal deformation field. In this case, for example, if the angle difference is large, the degree-of-deviation calculation unit 110 determines a high degree of deviation. If the angle difference is small, the degree-of-deviation calculation unit 110 determines a low degree of deviation. In addition, the degree-of-deviation calculation unit 110 can obtain the determinants (Jacobian) of Jacobian matrices of the real deformation field and normal deformation field at the position pj, and calculate a degree of deviation based on the difference between the determinants. In this case, if a difference in volume change in a local region between the real deformation field and the normal deformation field is large, the degree-of-deviation calculation unit 110 determines a high degree of deviation. The degree-of-deviation calculation unit 110 can also obtain the value of equation (3) or a Jacobian value at each point near the position pj, and use its integrated value as a degree of deviation. That is, the degree-of-deviation calculation unit 110 can calculate the degree of deviation of deformation information for the deformation model representing the deformation state of the object. Note that the above method is merely an example, and the degree-of-deviation calculation unit 110 can calculate the degree of deviation by a method based on comparison between the real deformation field (actual displacement) and the normal deformation field (displacement based on the statistically normal deformation model).

Note that the processing of calculating a degree of deviation based on the deformation field with reference to the space of the first image and generating a degree-of-deviation image has been explained but the degree-of-deviation calculation unit 110 can generate a degree-of-deviation image in the space of the second image instead of the space of the first image. In this case, with respect to each voxel (a three-dimensional position is represented by qj) within an object region $\Omega_2$ on the second image, the degree-of-deviation calculation unit 110 identifies the coordinate point pj on the first image, which is displaced to this voxel by inverse-conversion of the real deformation field $T_{real}$. That is, the degree-of-deviation calculation unit 110 obtains pj satisfying $qj=T_{real}(pj)$. The degree-of-deviation calculation unit 110 obtains the degree of deviation K(pj) by the same processing as that indicated by equation (3), and executes processing of obtaining this value as the voxel value at the coordinate point qj on the degree-of-deviation image. Note that the display control unit 112 of the image processing apparatus 100 can display, on the display unit 180, an arrangement (for example, a GUI) for prompting the user to select one of the spaces of the first and second images to be used as a reference for generating a degree-of-deviation image. In this case, the user can select, via the GUI, the first or second image as a reference for generation of a degree-of-deviation image. The degree-of-deviation calculation unit 110 executes processing of generating a degree-of-deviation image based on the user selection.

The degree-of-deviation calculation unit 110 can total the degrees of deviation in the respective voxels within the object region $\Omega_1$ while generating a degree-of-deviation image (or without generating a degree-of-deviation image), thereby calculating a degree of deviation for the entire image. For example, the degree-of-deviation calculation unit 110 can obtain the average or maximum value of the degrees of deviation, the number of voxels in each of which the degree of deviation exceeds a predetermined value (threshold), or the like as information representing the degree of deviation for the entire image. This can quantify a general trend of the degree of deviation of the target case from the normal cases (normal deformation). The degree-of-deviation calculation unit 110 divides the object region $\Omega_1$ into anatomically meaningful regions (for example, as for a breast, A region, B region, C region, C' region, D region, E region, and the like). The degree-of-deviation calculation unit 110 can total the degrees of deviation for each region, and quantify the obtained degree of deviation. In addition, the degree-of-deviation calculation unit 110 can perform processing of, for example, selecting a region where the degree of deviation is highest or a region where the degree of deviation exceeds a predetermined condition, and determine a region of interest based on the degree of deviation.

(Visualization of Degrees of Deviation: S205)

In step S205, the display control unit 112 displays information about the degrees of deviation on the display unit 180. For example, the display control unit 112 can perform display control to overlay a color map (to be referred to as a degree-of-deviation map hereinafter) as a map indicating the distribution of the degrees of deviation on the cross-sectional image of the grayscale first image. With respect to display of the degree-of-deviation map, the display control unit 112 can predefine the correspondence between the value of a degree of deviation and a display color in a table, and perform display control to overlay a display color determined according to the table on a corresponding voxel of the first image. In this way, the display control unit 112 can control display of the color map.

Figure 4:
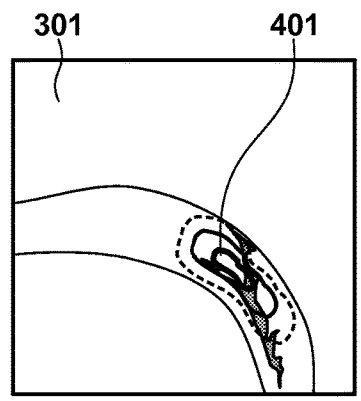
FIG. 4 is view showing an example of a degree-of-deviation display method according to the first embodiment.

Note that display form of the distribution of the degrees of deviation is not limited to overlaying a color map representing the degrees of deviation. For example, the display control unit 112 can perform display control to overlay the isopleths of the degrees of deviation on the cross-sectional image of the first image. Furthermore, when the user moves a mouse cursor on the cross-sectional image of the first image, the display control unit 112 obtains the degree of deviation at a coordinate point indicated by the cursor from the degree-of-deviation image in synchronism with the movement of the cursor. The display control unit 112 can perform display control to display the value of the obtained degree of deviation as character information near the cursor or at a predetermined position within the screen of the display unit 180. In addition, the display control unit 112 can control display of the display unit 180 to perform display in a display form in which, with respect to each region where the degree of deviation is equal to or higher than a predetermined value, information indicating the region is overlaid on the cross-sectional image of the first image and nothing is overlaid on the remaining regions. Note that the display form of the distribution of the degrees of deviation is not limited to overlaying on the first image, and the display control unit 112 can also control display of the display unit 180 so as to display the degree-of-deviation image of the same section as that of the first image beside the first image so that the degree-of-deviation image is readily compared with the first image. The display control unit 112 can perform display control of the display form of the distribution of the degrees of deviation in accordance with a user instruction. FIG. 4 exemplifies, as a display example of the distribution of the degrees of deviation, a case in which a degree-of-deviation map 401 defined on the first image is overlaid on a cross-sectional image 301 of the first image. For example, a lesion portion of a tomographic image obtained by an ultrasonic echo or the like tends to be darkly captured, and the degrees of deviation are overlaid on the captured image, thereby allowing a doctor to quickly specify the lesion portion in the image. With images captured by various image capturing apparatuses (modalities) and degree-of-deviation information, it becomes easy for a doctor to discover a lesion portion and determine the type, grade of malignancy, degree of progression, and the like of an abnormality.

Note that if information representing the degree of deviation of the entire image, information representing the degree of deviation for each anatomically meaningful region, information of region of interest based on the degree of deviation, and the like have been derived in step S204, the display control unit 112 displays the pieces of information on the display unit 180.

The display control unit 112 can extract the region of interest based on the degree-of-deviation image, and perform display control to display information of the region together with the cross-sectional image. For example, the display control unit 112 can extract a region where the degree of deviation is equal to or higher than a predetermined value from the degree-of-deviation image, determine a region satisfying a predetermined condition such as a volume as a region of interest, and perform display control to display information (number, volume, barycentric position, and the like) of the region.

As described above, the processing of the image processing apparatus 100 is executed. The image processing apparatus 100 according to this embodiment can confirm the presence/absence of deviation from the normal deformation and a region where deviated deformation has occurred. For example, in diagnosis of an infiltrating cancer presenting disturbance of tissue construction, even if it is difficult to detect an infiltrating cancer by a touch or findings in an ultrasonic image, a region where disturbance of tissue construction has occurred has a feature of impairing tissue elongation, and thus this can be visualized as deviation from the normal deformation.

In addition, in diagnosis of a noninfiltrating cancer, a noninfiltrating cancer has a feature of pulling surrounding tissues inward to cause dimpling, and thus this can be visualized and presented as deviation from the normal deformation. Since the image processing apparatus according to this embodiment can visualize and present the presence/absence of deviation from the normal deformation and a region where deviated deformation has occurred, it can support benign/malignant discrimination by a doctor in diagnosis of an infiltrating cancer and diagnosis of a noninfiltrating cancer.

Modification 1 of First Embodiment: Example of Deformation Model Except for Statistic Deformation In the first embodiment, a case in which a model representing statistically appropriate deformation is used as a deformation model by performing statistical processing in deformation from the first deformation state to the second deformation state has been exemplified. However, another deformation model may be used. For example, as a deformation model representing physically appropriate deformation, a finite element model (physical model) for a physical deformation simulation may be used. If, for example, the first image is used as a reference, the normal deformation calculation unit 106 generates, as a normal deformation field, a deformation field obtained by performing a physical deformation simulation for the first image. In generation of a normal deformation field, the normal deformation calculation unit 106 generates a normal deformation field by obtaining deformation representing a real deformation field by a physical deformation simulation as much as possible under constraints based on the physical model. This enables the degree-of-deviation calculation unit 110 to obtain the degree of deviation of the real deformation field with respect to the physically appropriate deformation (the normal deformation field based on the physical deformation simulation).

The normal deformation calculation unit 106 can use, as a deformation model representing anatomically appropriate deformation, a knowledge model obtained by modeling anatomical knowledge about the deformation of the object. In this case, the normal deformation calculation unit 106 generates a normal deformation field by obtaining deformation representing the real deformation field as much as possible in accordance with the knowledge model. This enables the degree-of-deviation calculation unit 110 to obtain the degree of deviation of the real deformation field with respect to deformation matching the anatomical knowledge. Note that according to this modification, the images of a plurality of normal cases for constructing a statistic deformation model become unnecessary.

Modification 2 of First Embodiment: Example of Calculating Real Deformation Field by Interactive Operation In the first embodiment, a case in which the real deformation field is calculated using image information (the first and second images) in the processing of the real deformation calculation unit 108 in step S202 has been exemplified. However, generation of the real deformation field is not limited to this processing. For example, pieces of position information (corresponding point information) of corresponding points between the first and second images are manually or automatically input, and the real deformation calculation unit 108 can calculate a real deformation field using the pieces of corresponding point information. In this case, in the processing in step S200, the data obtaining unit 104 obtains the three-dimensional positions of points input with respect to the second image and the three-dimensional positions of points on the first image corresponding to the points on the second image. In the processing in step S202, the real deformation calculation unit 108 adds, as a constraint condition, displacement of the three-dimensional positions of the points on the first image to those of the corresponding points on the second image when calculating a real deformation field. According to this modification, even if it is impossible to appropriately obtain a real deformation field by performing only processing using image information as in the case in which the first and second images are obtained by different modalities, it is possible to appropriately calculate a real deformation filed by using the corresponding point information.

Modification 3 of First Embodiment: Normal Deformation Field Calculation Method

In the first embodiment, in the processing in step S203, the normal deformation calculation unit 106 derives the normal deformation field by obtaining the parameter $\alpha_i$ so as to approximate the real deformation field most. However, the normal deformation field may be derived by processing different from the above one. For example, the normal deformation calculation unit 106 may derives $\alpha_i$ by obtaining, among deformation fields which can be represented by the deformation model of equation (1), a deformation field in which the result of deforming the first image by the deformation field is closest to (matches) the second image, and sets the obtained deformation field as a normal deformation field. At this time, the degree of matching between the images can be evaluated by, for example, the SSD (Sum of Squared Difference) of the voxel values (intensities) at the same position. Furthermore, it is possible to evaluate the degree of matching using a known evaluation criterion such as the number of voxels in each of which the absolute value of the intensity difference is equal to or smaller than a predetermined value, the residual between the pieces of position information of corresponding landmarks between the images, the similarity of the feature information between the images, or a cross-correlation.

Second Embodiment: Deriving of Shift from Preliminary Knowledge

In the first embodiment, the processing of obtaining a degree of deviation by comparing the real deformation field between the plurality of three-dimensional tomographic images and the normal deformation field based on the deformation model has been explained. On the other hand, an image processing apparatus according to this embodiment has as its main feature to calculate a degree of deviation based on preliminary knowledge about the deformation of a normal tissue without calculating a normal deformation field based on a deformation model. Only the differences from the first embodiment in the image processing apparatus according to this embodiment will be described below.

Assume that an object according to this embodiment is a breast. As for a normal tissue, it is known that the distance (to be referred to as a nipple-to-point distance hereinafter) between a nipple position and the position of an arbitrary point in the breast is almost constant regardless of the deformation state. If there is a region where the nipple-to-point distance changes when the object is deformed from the first deformation state to the second deformation state, the region may deviate from normal deformation. To cope with this, the image processing apparatus according to this embodiment obtains the degree of change of the nipple-to-point distance between the first image captured in the first deformation state and the second image captured in the second deformation state, and visualizes and displays the obtained degree of change of the nipple-to-point distance as a degree of deviation.

<Arrangements of Image Processing System 5000 and Image Processing Apparatus 500>

Figure 5:
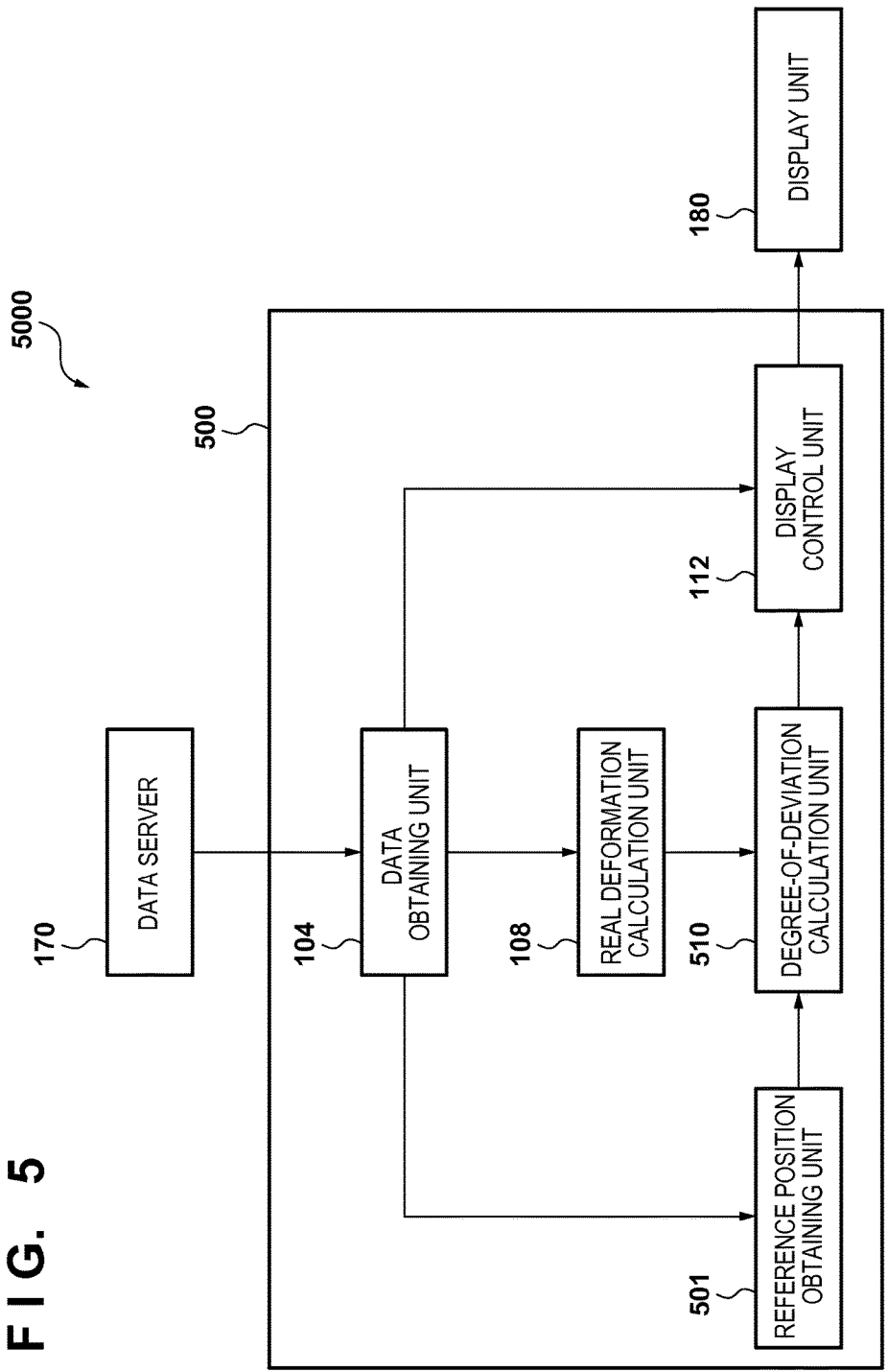
FIG. 5 is a block diagram showing the functional arrangements of an image processing system and image processing apparatus according to the second embodiment.

FIG. 5 shows the arrangements of the image processing system 5000 and image processing apparatus 500 according to this embodiment. Note that the same reference numerals as those in FIG. 1 denote the same parts and a description thereof will be omitted. The image processing apparatus 500 includes a data obtaining unit 104, a real deformation calculation unit 108, a display control unit 112, a reference position obtaining unit 501, and a degree-of-deviation calculation unit 510.

The reference position obtaining unit 501 obtains pieces of position information (in this embodiment, three-dimensional coordinate points of nipples) of reference points in the first and second images as pieces of information to be used to calculate a degree of deviation based on preliminary knowledge. Based on the real deformation field calculated by the real deformation calculation unit 108 and the pieces of position information of the reference points obtained by the reference position obtaining unit 501, the degree-of-deviation calculation unit 510 calculates the degree of deviation of the real deformation field based on the preliminary knowledge about normal deformation.

<Processing Executed by Image Processing Apparatus 500>

Figure 6:
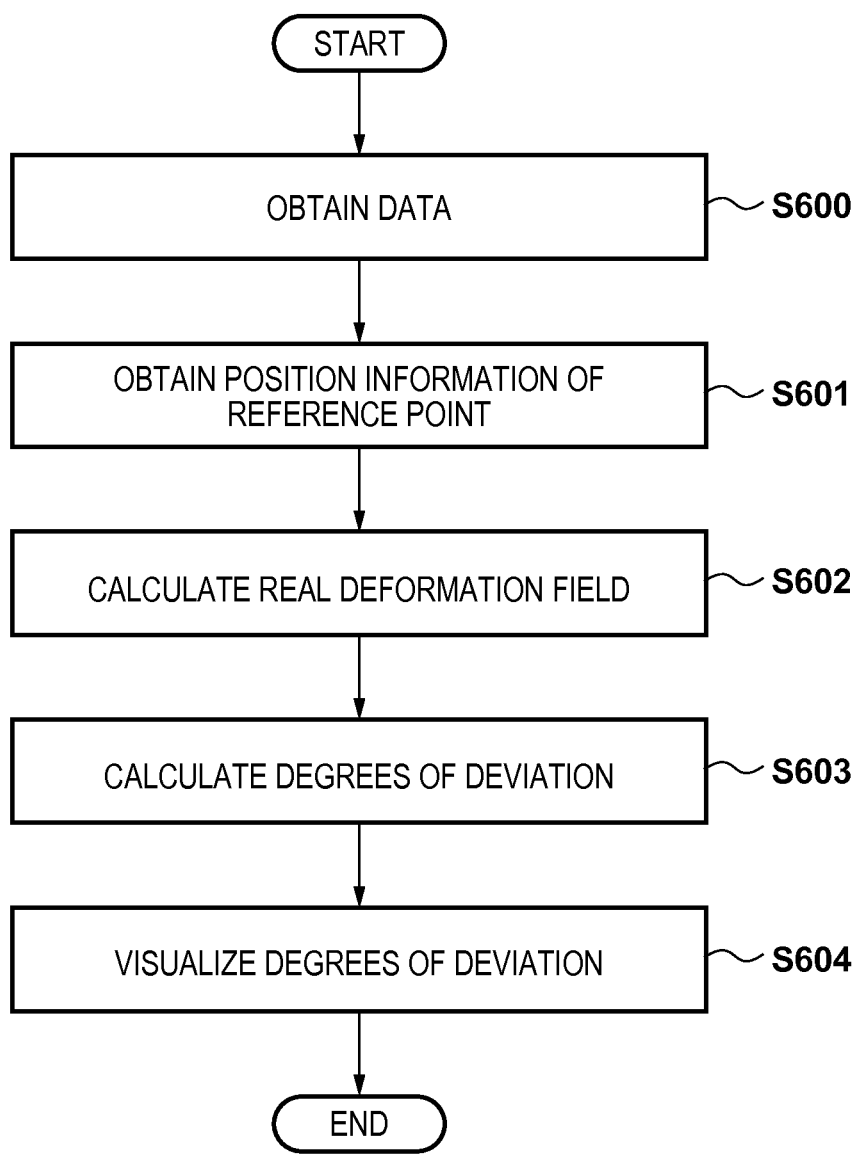
FIG. 6 is a flowchart illustrating an overall processing procedure according to the second embodiment.

An overall processing procedure executed by the image processing apparatus 500 according to this embodiment will be described with reference to a flowchart shown in FIG. 6. Note that processes in steps S600, S602, and S604 are the same as those in steps S200, S202, and S205 of FIG. 2 described in the first embodiment and a description thereof will be omitted.

(Obtaining of Position Information of Reference Point: S601)

In step S601, the reference position obtaining unit 501 obtains position information (in this embodiment, the three-dimensional coordinate point of a nipple position as an example of the position information of the reference point indicating the same portion of the object) of the reference point in the object to be used to calculate a degree of deviation from each of the first and second images. The obtained pieces of position information of the reference points (the three-dimensional coordinate points of the nipple positions) are output to the degree-of-deviation calculation unit 510. The pieces of position information (three-dimensional coordinate points of the nipple positions) of the reference points in the first and second images are represented by $n_1$ and $n_2$, respectively.

(Calculation of Degrees of Deviation: S603)

In step S603, the degree-of-deviation calculation unit 510 generates a degree-of-deviation image having, as a voxel value, a degree of deviation in each voxel within an object region $\Omega_1$ on the first image, and outputs the calculated degree-of-deviation image to the display control unit 112, as in the first embodiment. Note that in this embodiment, a method of calculating a degree of deviation in each voxel is different from the first embodiment. That is, when each voxel is set as a point of interest, the degree-of-deviation calculation unit 510 sets a corresponding point of interest on the object for each of the first and second images. The degree-of-deviation calculation unit 510 calculates, as a degree of deviation, a change between the positional relationship between the reference point and the point of interest in the first image and the positional relationship between the reference point and the point of interest in the second image.

As a change in positional relationship, the degree-of-deviation calculation unit 510 calculates, as a degree of deviation, the difference between the distance between the reference point and the point of interest ("the difference between the point of interest and the nipple (reference point)") in the first image and the distance between the reference point and the point of interest ("the difference between a point corresponding to the point of interest and the nipple (reference point)") in the second image. The difference between the distance values indicates a degree of deviation in this embodiment. The degree-of-deviation calculation unit 510 calculates a degree of deviation K(pj) at a voxel position pj by:

$$K(pj)=|pj-n_1|-|qj-n_2| \quad (4)$$

where $|pj-n_1|$ represents "the distance between the point of interest and the nipple", and qj represents the position of the point corresponding to the point of interest pj on the second image. That is, $|qj-n_2|$ represents "the distance between the point corresponding to the point of interest and the nipple". Calculation of equation (4) is equivalent to calculation of the difference in the nipple-to-point distance at the same point between the first and second deformation states. Note that the value of the position qj of the point corresponding to the point of interest pj on the second image is calculated using a real deformation field obtained in step S602, as given by:

$$qj=pj+T_{real}(pj) \quad (5)$$

where $T_{real}(pj)$ represents the real deformation field at the coordinate point pj.

If the value of the degree of deviation K(pj) is close to 0, a change in nipple-to-point distance at the point pj between the first and second deformation states is small. Based on knowledge that the nipple-to-point distance at the same point does not largely change in the normal deformation state, it is considered that a region near the position pj has been normally deformed. On the other hand, if the absolute value of the degree of deviation K(pj) is large, it is considered that deformation different from the normal model has occurred in a region near the position pj. Note that the degree-of-deviation calculation unit 510 can obtain a degree of deviation by any method other than that using the difference indicated by equation (4) as long as the method can measure the difference in nipple-to-point distance.

As a change in positional relationship, the degree-of-deviation calculation unit 510 calculates, as a degree of deviation, the ratio between the distance between the reference point and the point of interest in the first image and the difference between the reference point and the point of interest in the second image. For example, the degree-of-deviation calculation unit 510 can calculate the ratio between the nipple-to-point distances, that is, a degree of deviation by:

$$K(pj)=|pj-n_1|/|qj-n_2| \quad (6)$$

The degree-of-deviation calculation unit 510 calculates a degree of deviation with reference to knowledge that the nipple-to-point distance at the same point does not largely change in the normal deformation state. Note that the degree-of-deviation calculation unit 510 may calculate a degree of deviation by another method based on the invariability of the positional relationship between the nipple and the point instead of the method based on the criterion that the nipple-to-point distance does not change.

The degree-of-deviation calculation unit 510 can use, as an example of another method based on the invariability of the positional relationship between the nipple and the point, the criterion that the orientation between the nipple and the point with reference to the nipple does not largely change due to deformation. The orientation is specifically defined as follows. Assume that the reference coordinate system of an object image is defined by setting the horizontal direction as the X-axis, the back-and-forth direction as the Y-axis, and caudal direction of the object as the Z-axis. Assume also that $n=\{n_x, n_y, n_z\}$ represents the nipple position, $p=\{p_x, p_y, p_z\}$ represents an arbitrary position in the object, and $z=\{z_x, z_y, z_z\}$ represents the Z-axis vector (reference vector) on the reference coordinate system. In this case, the degree-of-deviation calculation unit 510 calculates an azimuth angle D(p) at the position p by:

$$D(p)=\cos^{-1}\{((p_x,p_z)-(n_x,n_y))\cdot(z_y,z_z)\} \quad (7)$$

This calculation processing indicates calculation of an angle difference by projecting the Z-axis vector (reference vector) and a vector connecting the position p (point of interest) and the nipple position n (reference point) onto the XZ plane on the reference coordinate system. The degree-of-deviation calculation unit 510 obtains azimuth angles D(pj) and D(qj) at the position pj (point of interest) in the first image and at the corresponding position qj (point of interest) in the second image calculated by equation (5), and calculates the difference between the azimuth angles as a degree of deviation. That is, the degree-of-deviation calculation unit 510 calculates, as a degree of deviation, the difference between angle information between the reference vector of the first image and a vector connecting the reference point and the point of interest in the first image and the angle information between the reference vector of the second image and a vector connecting the reference point and the point of interest in the second image.

Note that the degree-of-deviation calculation unit 510 can use a plurality of criteria to calculate a degree of deviation instead of using a single criterion. If a degree of deviation is calculated by combining a plurality of criteria, the degree-of-deviation calculation unit 510 weights degrees of deviation calculated based on the respective criteria by a weight parameter, and adds them, thereby calculating the final degree of deviation.

According to this embodiment, since clinically obtained anatomical knowledge that the nipple-to-point distance does not change in the normal deformation state can be directly used to calculate a degree of deviation, it is possible to calculate a degree of deviation more adaptive to the intuition of the user such as a doctor. Furthermore, since it is unnecessary to derive a normal deformation field which is required in the first embodiment, it is possible to reduce the calculation cost. In addition, since a statistic deformation model required in the first embodiment is unnecessary, it is possible to visualize deviation from the normal deformation without any input image constraints associated with postures such as "using a supine position image and a prone position image".

Third Embodiment: Deriving of Deviation Based on Difference Between Images

In the first embodiment, a degree of deviation is calculated based on the difference between the real deformation field between the plurality of three-dimensional tomographic images and the normal deformation field based on the deformation model. On the other hand, an image processing apparatus according to this embodiment has as its main feature to calculate a degree of deviation based on the difference between a real image and a deformed image generated by a normal deformation field based on a deformation model without calculating a real deformation field. Only the differences from the first embodiment in the image processing apparatus according to this embodiment will be described below.

<Arrangements of Image Processing System 7000 and Image Processing Apparatus 700>

Figure 7:
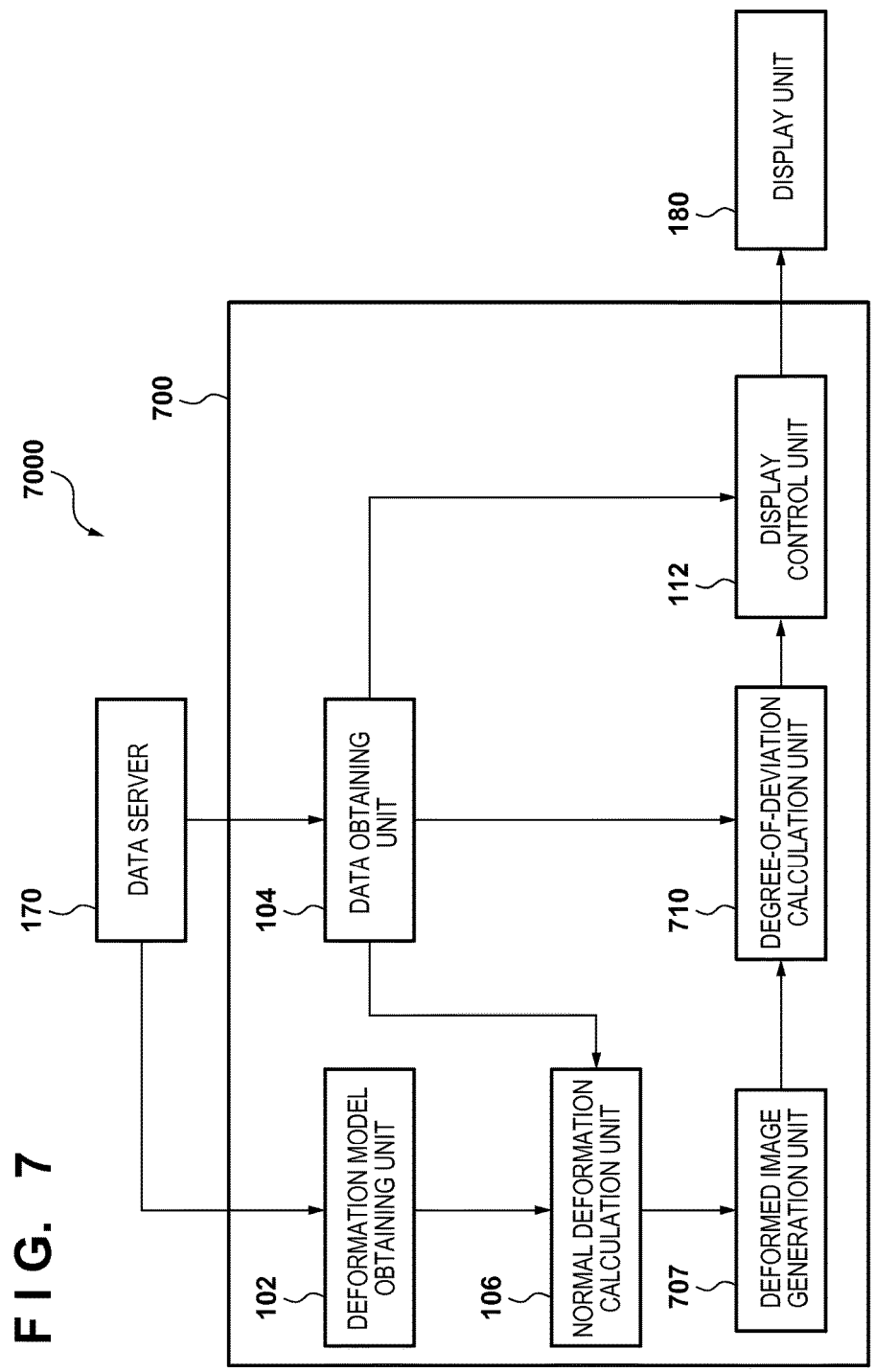
FIG. 7 is a block diagram showing the functional arrangements of an image processing system and image processing apparatus according to the third embodiment.

FIG. 7 shows the arrangements of the image processing system 7000 and image processing apparatus 700 according to this embodiment. Note that the same reference numerals as those in FIG. 1 denote the same parts and a description thereof will be omitted. The image processing apparatus 700 includes a deformation model obtaining unit 102, a data obtaining unit 104, a normal deformation calculation unit 106, a display control unit 112, a deformed image generation unit 707, and a degree-of-deviation calculation unit 710.

The deformed image generation unit 707 applies a normal deformation field obtained by the normal deformation calculation unit 106 to the first image obtained by the data obtaining unit 104, thereby generating an image (to be referred to as a deformed image or the third image hereinafter) by deforming the first image into the second deformation state based on the normal deformation field. The generated deformed image (third image) is output to the degree-of-deviation calculation unit 710. The deformed image (third image) generated by the deformed image generation unit 707 corresponds to an image deformed into the second deformation state by performing, for an object in the first deformation state, normal deformation which can be represented by a normal deformation model.

The degree-of-deviation calculation unit 710 calculates a degree of deviation based on the difference between the second image obtained by the data obtaining unit 104 and the deformed image (third image) generated by the deformed image generation unit 707. The second image represents the actual deformation state of the object in the second deformation state, and thus the difference between the real deformation (second image) and the normal deformation (third image) is quantified.

<Processing Executed by Image Processing Apparatus 700>

An overall processing procedure executed by the image processing apparatus 700 according to this embodiment will be described with reference to a flowchart shown in FIG. 8. Note that processes in steps S800, S801, and S805 are the same as those in steps S200, S201, and S205 of the first embodiment and a description thereof will be omitted.

(Calculation of Normal Deformation Field: S802)

In step S802, the normal deformation calculation unit 106 calculates a normal deformation field from the first image to the second image of a target case based on a deformation model obtained in step S801. The calculated normal deformation field is output to the deformed image generation unit 707. Note that since the image processing apparatus 700 according to this embodiment has no processing unit corresponding to the real deformation calculation unit 108 in the first embodiment, the processing in this step is executed by processing which is not based on the real deformation field described in Modification 3 of the first embodiment. The normal deformation calculation unit 106 derives $\alpha_t$ by obtaining, among deformation fields which can be represented by the deformation model of equation (1), a deformation field in which the result of deforming the first image by the deformation field is closest to (matches) the second image, and sets the obtained deformation field as a normal deformation field.

(Generation of Deformed Image: S803)

In step S803, the deformed image generation unit 707 generates a deformed image (third image) obtained by deforming the first image based on the normal deformation field obtained in step S802. The deformed image generation unit 707 outputs the generated deformed image (third image) to the degree-of-deviation calculation unit 710. Generation of the deformed image based on the deformation field can be implemented by a known method.

(Calculation of Degrees of Deviation: S804)

In step S804, the degree-of-deviation calculation unit 710 calculates a degree of deviation of the real deformation occurring in each voxel from the normal model based on the deformed image (third image) obtained in step S803 and the second image obtained from the data obtaining unit 104. The degree-of-deviation calculation unit 710 generates a degree-of-deviation image having the degree of deviation in each voxel as a voxel value. In this embodiment, the difference between the voxel values of corresponding voxels in the second image and the deformed image (third image) is defined as a degree of deviation. As a practical calculation method, the degree-of-deviation calculation unit 710 can calculate a degree of deviation by using, for example, the difference value between the voxel values of corresponding voxels or the absolute difference values of the voxel values. Instead of calculating a degree of deviation based on the direct difference between the second image and the deformed image (third image), the degree-of-deviation calculation unit 710 can calculate a degree of deviation based on the difference between the images having undergone preprocessing such as smoothing. By performing preprocessing such as smoothing, it is possible to reduce the influence of noise or the like in degree-of-deviation calculation processing, thereby accurately obtaining a degree of deviation.

According to this embodiment, it is possible to obtain a degree of deviation from the normal deformation state without calculating the real deformation field between the first and second images. Consequently, it is possible to reduce the calculation cost of the real deformation field. Furthermore, even if it is difficult to calculate real deformation due to a factor such as large deformation between the first and second deformation states, it is possible to calculate a degree of deviation.

According to each of the above-described embodiments, it is possible to provide new information representing the features of a lesion portion which is deformed differently with respect to the behavior of the lesion portion when an object is deformed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-225433, filed Nov. 5, 2014, which is hereby incorporated by reference herein in its entirety.

What is claimed is:

1. An image processing apparatus comprising:
at least one processor; and
at least one memory storing instructions that, when executed by the at least one processor, cause the at least one processor to function as:
an obtaining unit configured to obtain information on a first shape of an object and information on a second shape of the object;
a calculation unit configured to:
calculate, by a first method, a first deformation field from the first shape to the second shape as vectors representing deformation from the first shape to the second shape on the basis of a first deformation model representing how a shape in a first deformation state is deformed into a shape in a second deformation state different from the first deformation state, and
calculate, by a second method different from the first method, a second deformation field from the first shape to the second shape as vectors representing deformation from the first shape to the second shape on the basis of a second deformation model representing how the shape in the first deformation state is deformed into the shape in the second deformation state;
a degree-of-deviation calculation unit configured to calculate a degree of deviation between the first deformation field and the second deformation field; and
a display control unit configured to display information representing the degree of deviation.

2. The apparatus according to claim 1, wherein the first deformation model is a model representing how the shape of a normal tissue in the first deformation state is deformed into the shape of the normal tissue in the second deformation, and
the first deformation model is a model generated based on images captured in a plurality of normal cases.

3. The apparatus according to claim 1, wherein the first shape is a shape of the object in the first deformation state and the second shape is a shape of the object the second deformation state, and
wherein the first deformation model is a model generated using a plurality of images obtained by capturing normal tissues in the first deformation state and a plurality of images obtained by capturing the normal tissues in the second deformation state.

4. The apparatus according to claim 1, wherein the display control unit is configured to overlay a distribution of the degrees of deviation as a map on a cross-sectional image of the object.

5. The apparatus according to claim 1, wherein the display control unit is configured to overlay an isopleth of the degree of deviation on a cross-sectional image of the object.

6. The apparatus according to claim 1, wherein the display control unit is configured to overlay character information indicating the degree of deviation on a cross-sectional image of the object.

7. An image processing method comprising:
obtaining information on a first shape of an object and information on a second shape of the object;
calculating a first deformation field from the first shape to the second shape as vectors representing deformation from the first shape to the second shape on the basis of a first deformation model representing how a shape in a first deformation state is deformed into a shape in a second deformation state different from the first deformation state by a first method, and
calculating a second deformation field from the first shape to the second shape as vectors representing deformation from the first shape to the second shape on the basis of a second deformation model representing how the shape in the first deformation state is deformed into the shape in the second deformation state by a second method different from the first method;
calculating a degree of deviation between the first deformation field and the second deformation field; and
displaying information representing the degree of deviation.

8. A non-transitory computer-readable storage medium storing a program for causing a computer to:
obtain information on a first shape of an object and information on a second shape of the object;
calculate a first deformation field from the first shape to the second shape as vectors representing deformation from the first shape to the second shape on the basis of a first deformation model representing how a shape in a first deformation state is deformed into a shape in a second deformation state different from the first deformation state by a first method; and
calculate a second deformation field from the first shape to the second shape as vectors representing deformation from the first shape to the second shape on the basis of a second deformation model representing how the shape in the first deformation state is deformed into the shape in the second deformation state by a second method different from the first method;
calculate a degree of deviation between the first deformation field and the second deformation field; and
display information representing the degree of deviation.

9. The apparatus according to claim 1, wherein
the calculation unit is configured to calculate, on the basis of the first deformation model, the information on the first shape, and the information on the second shape, the first deformation field of the object by deforming the first shape such that a result of deforming the first shape matches the second shape.

10. The apparatus according to claim 1, wherein the degree-of-deviation calculation unit is configured to calculate, as the degree of deviation, an angle between a vector representing the first deformation field and a vector representing the second deformation field.

11. The apparatus according to claim 2, wherein
the second method includes a Free-Form Deformation method, or a Large Deformation Diffeomorphic Metric Mapping method.

* * * * *